March 17, 1931. F. G. CARRINGTON 1,796,644
METHOD OF AND APPARATUS FOR REGULATING COOLING OF TROUGHS
Filed April 13, 1927 7 Sheets-Sheet 2

Inventor
F. G. CARRINGTON
By Semmes & Semmes
Attorneys

March 17, 1931.  F. G. CARRINGTON  1,796,644

METHOD OF AND APPARATUS FOR REGULATING COOLING OF TROUGHS

Filed April 13, 1927  7 Sheets-Sheet 4

Inventor
F. G. CARRINGTON
By Semmes & Semmes
Attorney

March 17, 1931.  F. G. CARRINGTON  1,796,644
METHOD OF AND APPARATUS FOR REGULATING COOLING OF TROUGHS
Filed April 13, 1927    7 Sheets-Sheet 5

Inventor
F. G. CARRINGTON
By Semmes & Semmes
Attorneys

Patented Mar. 17, 1931

1,796,644

UNITED STATES PATENT OFFICE

FRANK G. CARRINGTON, OF ANNISTON, ALABAMA, ASSIGNOR TO FERRIC ENGINEERING COMPANY, OF ANNISTON, ALABAMA, A CORPORATION OF DELAWARE

METHOD OF AND APPARATUS FOR REGULATING COOLING OF TROUGHS

Application filed April 13, 1927. Serial No. 183,465.

This invention relates to a cooling system, and more particularly has to do with a cooling system for a casting trough.

While my invention is adapted for use with any type of trough in centrifugal casting operations, it is particularly suitable for a so-called "end bore" trough, which is supported at only one end.

There is very little clearance between the trough and the mold, especially between the bottom of the trough and the mold. This is necessarily so, for splashing of the poured metal should be avoided and one means of preventing this is by reducing the distance through which the metal must fall from the trough to the mold. In small molds the trough of necessity will be in extremely close proximity to the mold. It is, therefore, essential that the trough maintain its original shape, and any warpage is to be avoided. The slightest sagging or horizontal warpage of the trough may result in the trough's scraping against the mold or the poured metal.

Horizontal warpage is largely the result of the high temperatures under which the objects are cast. While the materials employed in the apparatus are selected to withstand the extreme heat to which they are subjected, considerable heat interchange between the metal and the apparatus cannot be prevented. As the temperature of the trough increases, it undergoes an attendant expansion. Little difficulty would be encountered were this expansion uniform, but there is an uneven expansion. This is frequently the result of only differences in distance from the molten metal. In many instances, however, the heat conducting property of the same trough varies within different portions of itself. Such differential expansions cause a warping of the apparatus, particularly in the case of the trough is this true. This difference in heat conductivity of various parts of the trough furthermore may vary throughout its life.

In my co-pending application Serial No. 170,547, filed February 24, 1927, reference to which is made, I have shown means for preventing the warpage above referred to. The trough therein set forth accomplishes the desired result, efficiently in the case of drooping, and, in the case of horizontal warpage, to the same extent that nicety of adjustment permits.

Difficulty, however, has been experienced in adjusting the various valves therein set forth to prevent warpage and sagging. To prevent warpage in a horizontal plane, the expanding side of the trough must be cooled at a greater rate than the other. The cooling effect of any system is the function of the heat conductivity of the trough, the temperature of the medium, and the velocity of the cooling medium through the channels provided in the trough.

Any one of these factors may be varied to compensate for variance in the others. Inasmuch as the heat conductivity of a given portion of the trough remains approximately uniform over a given period, variance must be made either in the velocity, which depends upon the pressure to which the cooling medium is subjected, or the temperature of the medium.

Heretofore the pressure and temperature of the medium have been manually regulated by valves positioned in the conduits for conveying the medium to the trough. Great difficulty, however, has been experienced in manually securing such an adjustment of these valves as to prevent horizontal warpage of the trough. The adjustment required calls for a definite ratio between the valves, and this ratio usually varies as any one of the valves is varied. Heretofore, each readjustment of any one valve necessitated a readjustment of the other valves by a "cut and fit" method. Such a system precluded a precision of control in the cooling effect obtained.

It is one of the purposes of the present invention to overcome the above objections by providing a cooling system for a casting trough having regulating means for varying the cooling effect of the system; the advantage of such a system being to prevent warpage of the trough within the mold.

In order more fully to comprehend my invention, reference is made to the accompanying drawings in which various forms of apparatus are set forth, but it is to be understood that many modifications may be made in the apparatus and method without exceeding the scope of the appended claims.

Figure 1:
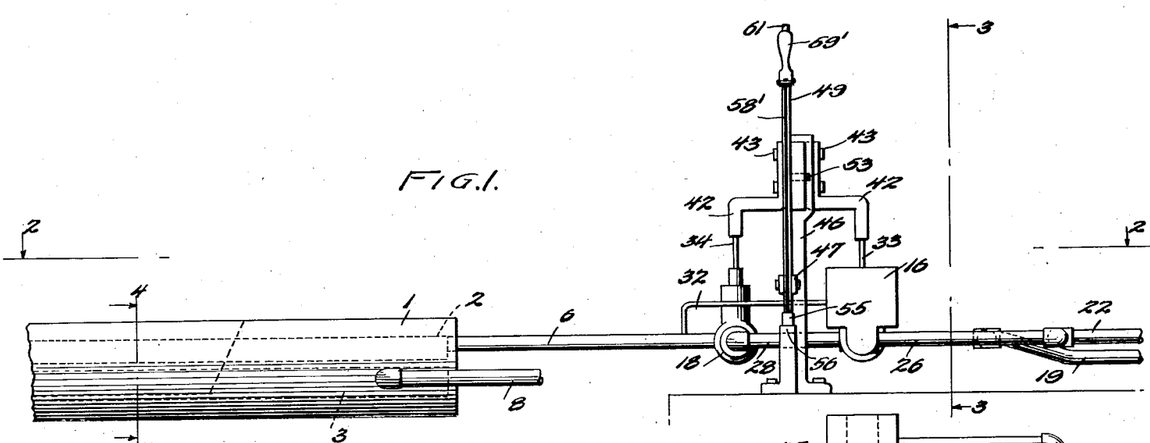
Figure 1 is a side elevational view of the cooling system and regulating means.
Figure 2:
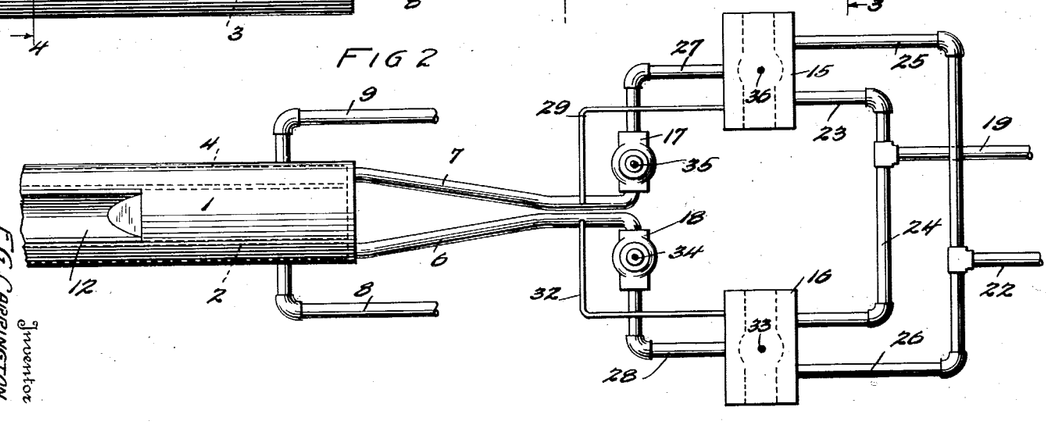
Fig. 2 is a top plan view of the same along the line 2—2 of Fig. 1, looking in the direction of the arrows.
Figure 4:
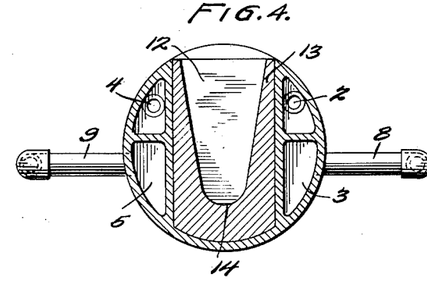
Fig. 4 is a cross sectional view of the pouring trough along the line 4—4 of Fig. 1, looking in the direction of the arrows.

Referring to Figures 1, 2 and 4, there is shown a casting trough 1, provided with channels 2, 3, 4 and 5. Pipes 6 and 7 supply the channels 2 and 4 with a cooling medium. This medium flows the length of the channels 2 and 4 and at the end of the trough empties into the channels 3 and 5. Outlet pipes 8 and 9 from the channels 3 and 5 are provided, and receive the cooling medium after its passage through the trough channels.

Referring more particularly to Fig. 4, in which there is shown in more detail the arrangement of the casting trough, the two channels 2 and 4 are mounted on each side of a channel 12 for conveying the molten metal. The metal channel is in a lining 13, and extends to a substantial depth, as at 14, in the trough. It will be noted that the channels 2 and 4 are located on each side of the metal channel near the top of the trough. The channels 3 and 5, however, are positioned in the bottom portion of the trough, and are larger than the channels 2 and 4, therefore permitting a slower passage of the cooling medium than the upper conduits.

Reference is made particularly to my copending application Serial No. 170,547, in which there is described in more detail a trough of this character. While the cooling system forming the subject of the present invention is not limited in its application to the specific form of trough disclosed in my copending application, nevertheless the trough there described lends itself particularly to the present system and I prefer to use it in connection therewith. The trough herein described prevents substantial sagging, for as the medium passes through the conduits 2 and 4 and the channels 3 and 5, its temperature progressively increases, and the mean temperature of the medium in the conduits 2 and 4 is lower than that in the channels 3 and 5. Inasmuch as sagging of the trough results from expansion of the upper portion of the trough at a greater rate than the lower portion, the differential temperature between the top and bottom conduits causes a greater contraction of the top than the bottom, offsetting the stresses mentioned, and hence preventing sagging of the trough.

In my prior application supra, horizontal warpage of the trough can also be prevented providing there is proper regulation of the temperatures and pressures of the cooling medium entering each side of the trough. Proper manual regulation, however, is difficult if not impossible of attainment, for each change of temperature of the medium in one side of the trough requires a corresponding, but not identical, change in the temperature of the medium in the other cooling conduit.

The cooling effect of the medium is not the result alone of the temperature of the medium, but also depends upon its velocity through the system, which in turn varies with the pressure of the medium at various points in the system. There is the necessity therefore not only of varying a temperature regulating valve for each side of the trough, but also regulating two pressure valves to maintain the cooling differential.

Warpage of the trough in a horizontal plane, providing the cooling effect on each side of the trough is the same, is produced by a difference in heat conductivity of the material composing the trough. If, for instance, the metal in the left side of the trough conducts heat to a greater extent than the right side of the trough, there will be set up in the left side an expansion more pronounced than in the right, with consequent warpage of the trough to the right. While this condition may exist when the trough is first operated, it frequently happens that the conductivity of the material on one or the other side of the trough varies during the lifetime of the trough. But for any given condition of the trough the velocity and the temperature of the cooling medium in each side may be so regulated that the differential in these two factors offsets the difference in expansion of the trough.

Over the period required to cast a series of objects, the degree of cooling required varies. When metal is actually being poured through the trough the greatest cooling is necessary, and the degree of cooling must progress as the period of pouring increases. However, after one casting operation it is not desirable to allow the trough to return to atmospheric temperature, but rather it is preferred that it be maintained heated to a certain degree. It is therefore necessary to reduce the velocity, or increase the temperature, of the cooling medium forced through the system. When such changes are required, the various valves are not opened and closed to the same extent, but there is a definite relationship existing between them for any given temperature and pressure of any one of them.

Referring again to Figs. 1 and 2, there are shown temperature regulating valves 15 and 16 of any of the commercial types, and conventional pressure regulating valves 17 and 18. The cooling medium is conveyed from two sources of supply to the valves by means of pipes 19 and 22. Pipe 19 empties into pipes 23 and 24, and pipe 22 is connected to pipes 25 and 26, for supplying the temperature regulating valves 15 and 16 with the medium. The two sources of supply are of different temperatures, one above the temperature desired in the trough and the other below. In the temperature regulating valves the cooling medium of two temperatures is mixed, resulting in a medium of a definite temperature.

The resultant mixes are conveyed by means of the pipes 27 and 28 to the pressure regulating valves 17 and 18. These latter valves subject the medium emanating therefrom to a desired pressure and maintain that pressure. The medium is conveyed by the pipes 6 and 7 to the trough, the pipe 7 supplying the conduit 4 in the trough and the other pipe 6 supplying the conduit 2 with the medium.

The temperature regulating valves being once set, maintain constant the resulting mix. This is accomplished by means of feed-backs 29 and 32 which are joined to the conduits 7 and 6 respectively. By feedback is meant either a conduit for the cooling medium or a means for transmitting to the valve the temperature of the medium at that point in the system to which it is connected. Where I speak of supplying a valve with a portion of the medium from some point in the system, I mean conveying the temperature of the medium at that point to the valve. The temperatures of the mixes therefore are dependent upon the temperatures of the medium in the conduits 6 and 7.

Figure 3:
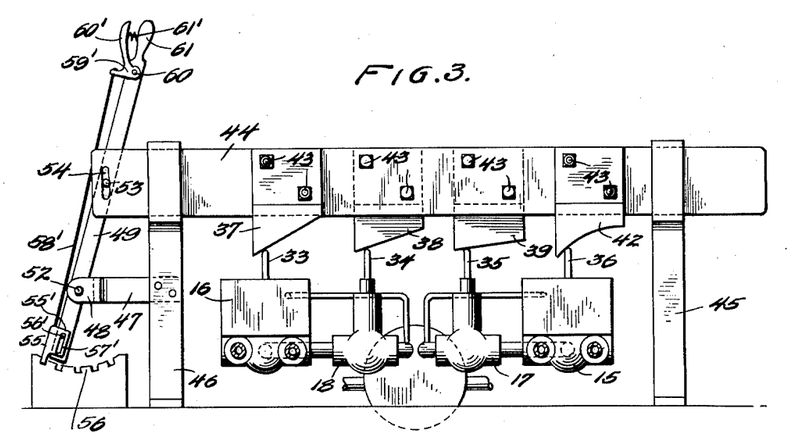
Fig. 3 is an elevational view of the apparatus along the line 3—3 of Fig. 1, looking in the direction of the arrows.

Referring to Fig. 3, there is shown a more detailed view of the operation of the valves. The valves are provided with stems 33, 34, 35 and 36 which contact with plates 37, 38, 39 and 42. These plates are actually cams, and horizontal movement of them results in an adjustment of the valves. These cam surfaces are mounted by means of bolts 43, or other suitable fastening means, on a slidable member 44. This member is supported in standards 45 and 46 which permit its horizontal movement. The standard 46 is provided with an arm 47 bifurcated as at 48. A lever 49 is pivotally mounted, as at 52, in the bifurcated arm and is also provided with a bolt 53 which fits in a slot 54 at the end of the member 44.

A pawl member 55 is adapted to engage with a ratchet member 56 to hold the lever 49 in any desired position. The pawl 55 is provided with flanges 55' which fit on opposite sides of the lever 49, and permit the pawl to slide on the lever. A pin 56' is adapted to fit in a slot 57' which is made in either, or both, of the flanges 55', and acts as a guide for the pawl 55 while permitting it to slide on the lever 49.

For raising and lowering the pawl to permit it to engage with different teeth on the ratchet 56, there is a control rod 58' attached at one end to the pawl 55 and at the other end to one arm of a bell crank lever 59', pivoted at 60 on the lever 49. By grasping a handle 61 at the upper end of the lever 49 and at the same time grasping the arm 60' of the bell crank lever 59', the pawl 55 is disengaged from the teeth of the ratchet 56, and the lever 49 can be shifted to any desired position. By releasing the grip of the operator on the handle 61 and the arm 60' of the bell crank lever 59', the pawl 55 again engages the teeth of the ratchet 56 and maintains the lever in any desired position. A spring 61' causes the arm 60' of the bell crank 59' to be normally pressed away from the handle 61 to hold the pawl 55 in its lowermost position and in engagement with the ratchet teeth.

Movement of the lever 49 therefore results in a sliding of the member 44 in the support members 45 and 46. The cam surfaces are consequently moved over the stems of the valves and vary the operative height of the stems.

Figure 5:
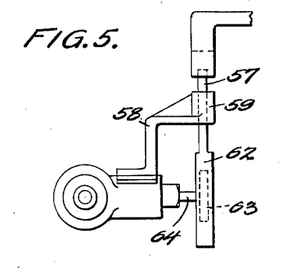
Fig. 5 is a view of modified means for actuating valves.
Figure 6:
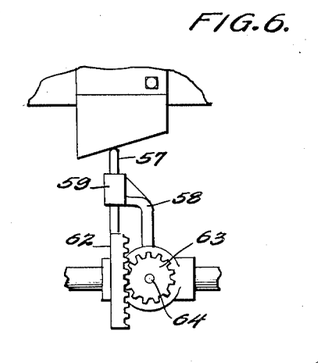
Fig. 6 is another view of the means shown in Fig. 5 for actuating the valves.

Vertical movement of the stems may be transformed to angular movement for valves having an angular adjustment. There are shown in Figs. 5 and 6 means for accomplishing this, comprising a rack and gear. A stem 57 corresponds to the stems of the valves shown in Fig. 3. The stem is supported in an arm 58 and sleeve 59 suitably mounted on the valve. The lower portion of the stem 57 is provided with a rack 62. This rack meshes with a spur gear 63 mounted on a shaft 64, which extends within and regulates the valve. Vertical movement of the stem and rack therefore is transferred to a rotation of the rotary gear and shaft, resulting in adjustment of the valve. The top of the stem 57 rests against the cam surfaces as do the stems shown in Fig. 3.

The valves shown in Fig. 3 are of a construction which insures an upward thrust of the stems. Should the valves be of a different type, however, requiring means for maintaining the stems in contact with the cam surfaces, I have shown in Figs. 7 and 8 one arrangement for accomplishing this result. Mounted on the side of each valve is a piston type mechanism 65. This comprises a cylinder 66 with a plunger 67 mounted therein. A plunger rod 68 suitably fixed to the plunger, passes through the top 69 of the cylinder and is joined to an arm 72 which is affixed to the stem 33, for instance of the valve 16.

Figure 7:
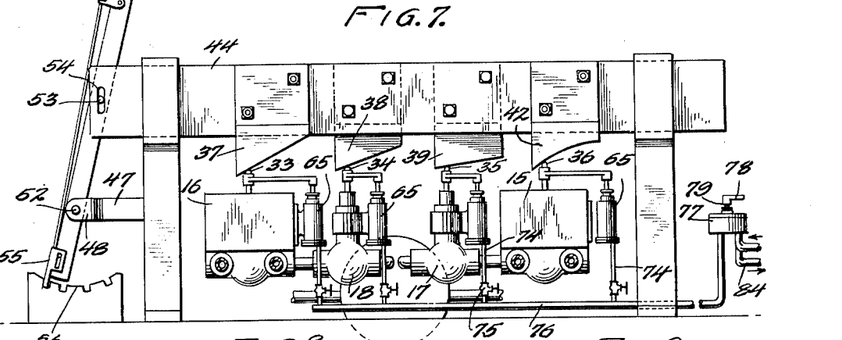
Fig. 7 is a view in elevation of an apparatus, in which the stems of the valves are maintained in contact with cam surfaces by means of plungers.
Figures 8, 9, 10:
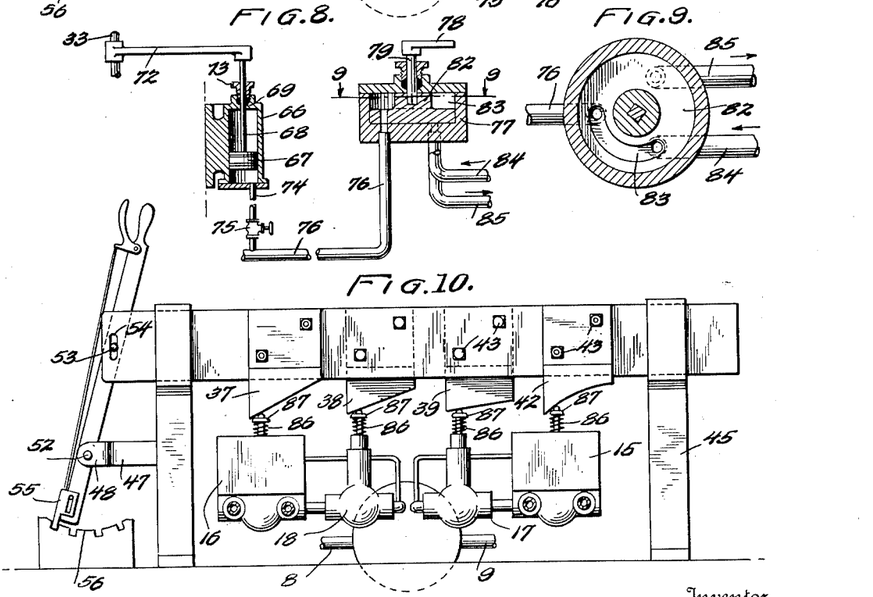
Fig. 8 is a more detailed view of the plungers shown in Fig. 7 and the regulating means therefor, the figure being partly in cross section and partly elevational.
Fig. 9 is a sectional view of the valve for regulating the plungers, taken along the line 9—9 of Fig. 8, looking in the direction of the arrows.
Fig. 10 is a view in elevation of a cooling system in which the valve stems are maintained in position by means of springs.

The plunger rod passes through a gland 73, or other water sealing means, insuring a watertight fit. A fluid, either liquid or gas, is introduced to the cylinder through a pipe 74. This pipe is provided with a valve 75 for opening or closing the conduit near the piston. The pipe 74 is supplied with the fluid from a pipe 76 which carries a sufficient amount to supply all of the cylinders with the fluid.

Referring also to Fig. 9, a valve 77 is provided for regulating the amount of fluid admitted in the piston. This is a rotary valve provided with a control lever 78, and mounted on a stem 79. A rotatable valve 82 is mounted on the stem, and is provided with an arcuate slot 83. The valve is supplied with the fluid by a pipe 84, and there is another pipe 85 for discharging the fluid from the system.

The slot 83 is of a length sufficient to uncover the terminals of the intake pipe 84 and the pipe 76, or the terminals of the pipe 76 and the outlet pipe 85. Rotation of the valve therefore results in a fluid being introduced into the pipe 76, or in permitting the fluid in the pipe 76 to escape through the outlet pipe 85.

When the lever opens the valve, fluid is forced into the cylinder. This tends to raise the plunger in the cylinder, and consequently forces the stem of the valve upward into contact with the cam surfaces. Presence of fluid in the cylinder maintains the stem in contact with the cam, and movement of the cam to lower the valve stem forces the piston down and compresses the fluid that is in the cylinder.

In Fig. 10 there is substituted for the cylinder helical springs 86 which force the stem upward. The upper ends of the springs are held in position by shoulders 87 and the lower portions rest on the top of the valves. These springs maintain the stem in contact with the cam surfaces, but permit vertical movement when the cams depress the stems.

Other means for accomplishing the result obtained by either the cylinder or the spring may of course be substituted. The valves shown in the other figures of these drawings are of a type in which the stems are faced upward without the use of either a cylinder or springs, but whenever such valves are shown, substitution may be made therefor as above pointed out.

Numerous variations may be made in my invention, and I have set forth in the drawings several modifications. Under certain conditions of operation these modifications might be desirable.

Figure 11:
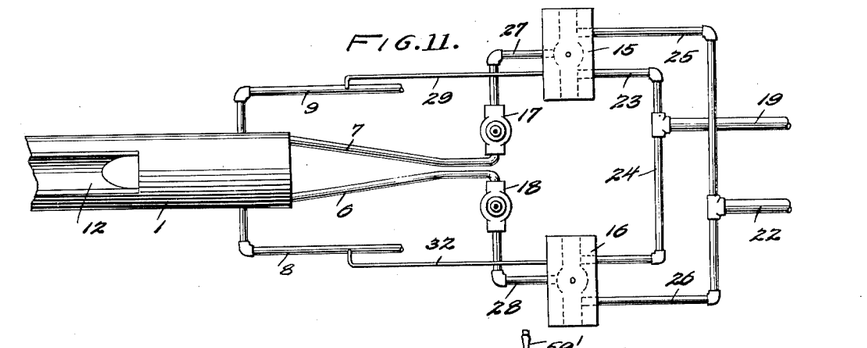
Fig. 11 is a view of a modification of the apparatus shown in Fig. 1.

Figure 11 shows a device similar in all respects to that shown in Figs. 1, 2 and 3, except that the feed-backs 29 and 32 to the temperature regulating valves 15 and 16 are attached to the discharge pipes 8 and 9 of the trough. It may well be desirable, under certain circumstances to employ the temperature of the discharged medium as the criterion of the resulting mix of the temperature regulating valves. The temperature of the discharged medium is of course different from that in the conduits 6 and 7 feeding the trough. There is considerable heat interchanged between the cooling medium and the trough during the passage of the former through the channels 2 and 4 and 3 and 5, and the resulting temperature of the medium might be preferred as a regulating means to that of the temperature of the medium emanating from the pressure regulating valve and before its entrance into the trough.

Figure 12:
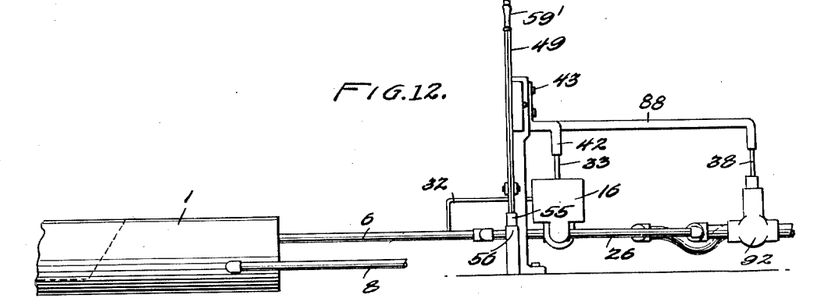
Fig. 12 is a side view of a cooling system and regulating means, in which the cooling medium passes through pressure regulating valves before being mixed.
Figure 13:
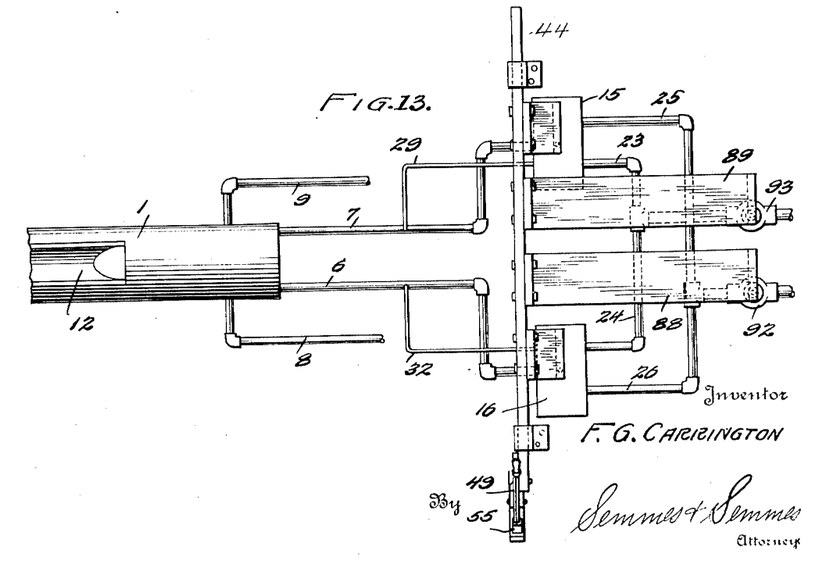
Fig. 13 is a top plan view of the apparatus shown in Fig. 12.

In Figs. 12 and 13, a cooling system in which a medium passes through pressure regulating valves, as at 92 and 93, prior to its passage through the temperature regulating valves 15 and 16 is depicted. This arrangement may be preferable under certain circumstances, for the medium introduced to the temperature regulating valves will then be at a predetermined rate. The exigencies of certain casting operations might call for such an arrangement. In such an event, arms 88 and 89 extend from the support member 44, and carry the cam surfaces 38 and 39 required for the pressure regulating valves. The same principles of operation obtain, for there is still required a definite relationship between all of the valves at any given temperature or pressure.

Figure 14:
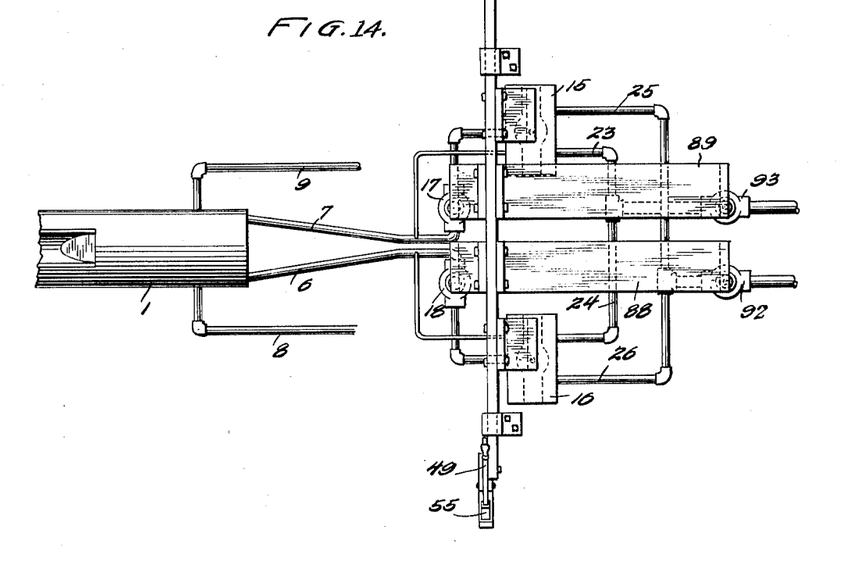
Fig. 14 is a top plan view of an apparatus in which the pressure of the cooling medium is regulated both before and after mixture.
Figure 15:
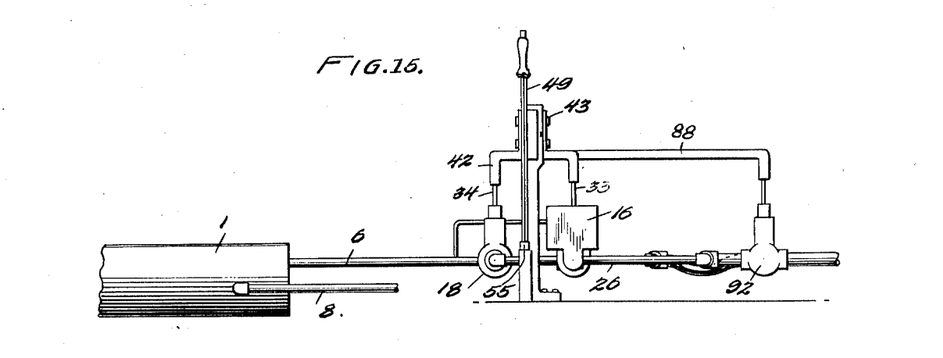
Fig. 15 is a side elevation of the apparatus shown in Fig. 14.

Another modification that may be incorporated in my invention is an apparatus of the character set forth in Figs. 14 and 15. Here there are shown pressure regulating valves positioned in the system both before, as at 92 and 93, and after, as at 17 and 18, the temperature regulating valves. The medium introduced to the temperature regulating valves will therefore be of a determined degree, and there are also provided the pressure regulating valves after the temperature valves in order to provide a check on the pressure of the medium flowing into the trough. Here again extensions 88 and 89 are made from the support member to carry cam surfaces, and such extensions are provided for each valve in the system.

In all of the foregoing figures, except Fig. 11, the feed-backs for the temperature regulating valves are connected to the conduits 6 and 7 which empty into the channels of the trough. As above set forth, it may be necessary, or desirable at least, to have the temperature in the discharge pipes 8 and 9 control the regulation of the temperature valves.

Figure 16:
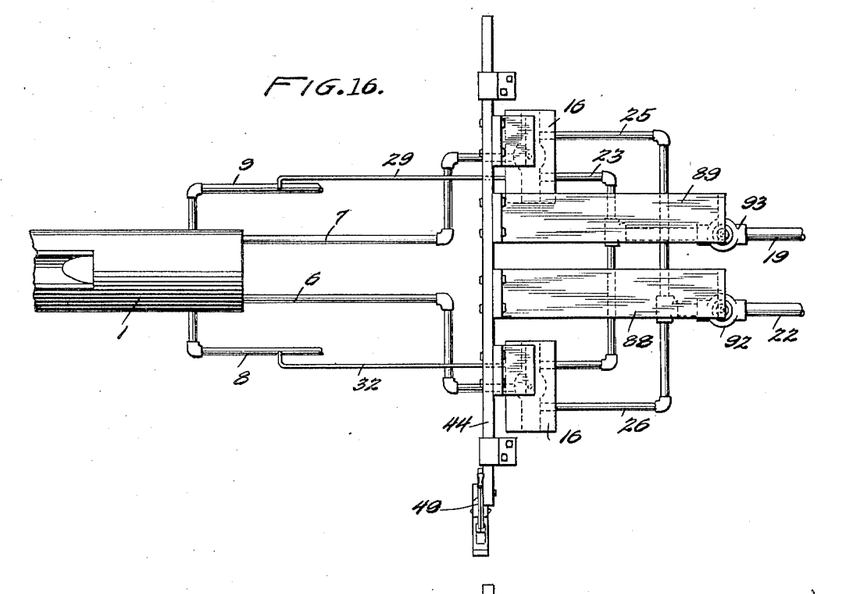
Fig. 16 is a view of an apparatus similar to that shown in Figs. 8 and 9, except that the mixture of the cooling medium is determined by the temperature of the medium on being discharged from the trough.

Figure 16 shows such an arrangement for a system wherein the pressure regulating valves are placed before the temperature regulating valves in the apparatus.

Figure 17:
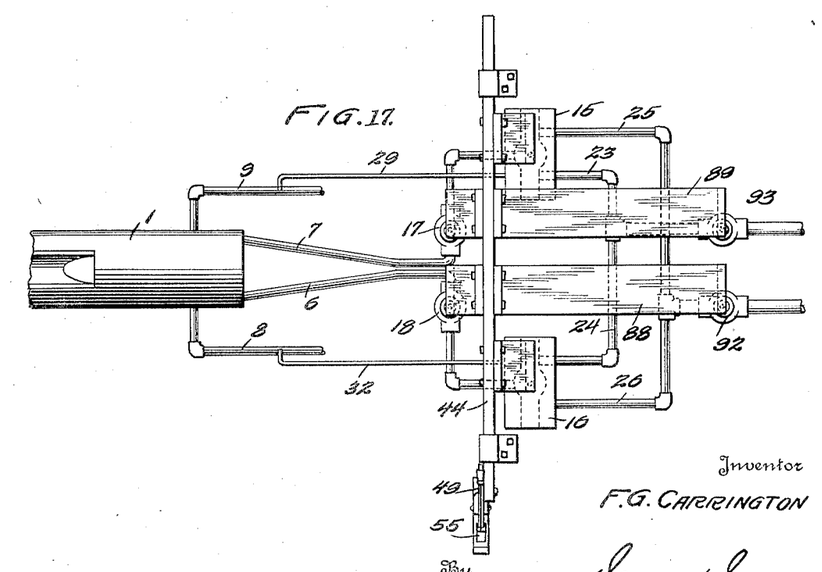
Fig. 17 is a view in top plan of an apparatus similar to that shown in Figs. 14 and 15, except that the temperature of the medium on discharge from the trough governs the temperature regulating valve.

In Fig. 17 there is shown a system similar to that shown in Figs. 14 and 15, but with the feed-backs connected to the discharge pipes 8 and 9. The same consideration which obtains in those cases where it is desired to have the temperature of the discharged medium regulate the action of the temperature valves, prevails in this instance.

In all of the foregoing drawings, the pressure regulating valves shown are of a type which maintains the pressure according to the temperature of the medium immediately before discharge from the valve. Under certain circumstances, it may be desirable that the regulation of the pressure valve be determined according to the pressure of the cooling medium in the system in some point other than that immediately adjacent the valve.

Figure 18:
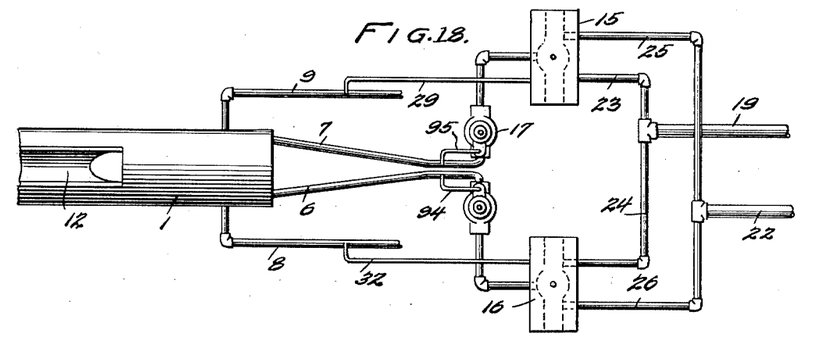
Fig. 18 is a top plan view of a cooling system in which the temperature regulating valves are controlled by the temperature of the cooling medium in the outlet and the pressure regulating valves are provided with feed-backs from the conduit supplying the casting trough.

The distance of separation of this point from the valve may be varied and I have shown in Fig. 18 an arrangement whereby this distance is only a short way from the pressure valve. It does, however, illustrate the general principle underlying such a modification. There are provided feed-backs 94 and 95 from the conduits 6 and 7, which convey to the pressure valve a portion of the liquid of the medium, under the same pressures as exist in the conduits. The valves therefore maintain the pressure of the fluid at the same pressures as obtain in the conduits 6 and 7.

Figure 19:
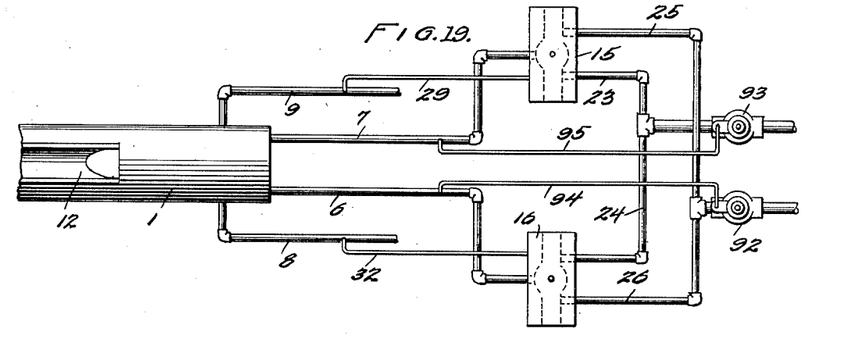
Fig. 19 is a view in top plan of an apparatus similar to Fig. 18, except that the pressure regulating valves are positioned in the cooling system before the temperature regulating valves.

In Fig. 19, the system there shown is one in which the pressure valves are positioned ahead of the temperature valves in the system. The pressure of the liquid at the same point, as in Fig. 18, is desired in this instance as a regulating means for the pressure valve. The two feed-backs therefore are positioned in this drawing at the same point on the conduit and extend to the pressure valve.

Figure 20:
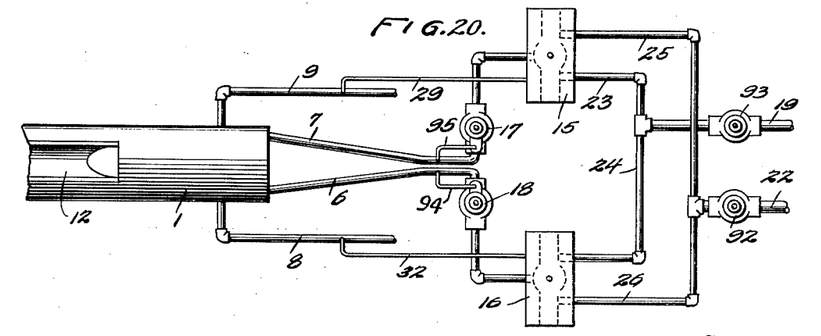
Fig. 20 is a top view of an apparatus in which pressure regulating valves are positioned both before and after temperature regulating valves, and in which feed-backs from the outlet pipes of the trough regulate the temperature regulating valves, and the pressure regulating valves after the temperature regulating valves in the system are controlled by feed-backs from the conduit entering the casting trough.

Figure 20 shows an apparatus similar to that shown in Figs. 14 and 15, in general principles, but there are provided for the last valves 17 and 18 in the system feed-backs 94 and 95 from the pipes 6 and 7. The pressure valves 92 and 93 are regulated by the pressure of the medium at the point of exit from them, while valves 17 and 18 are regulated by the pressure of the medium in the conduits 6 and 7. Of course, feed backs may be provided for the valves 92 and 93 should necessity require it.

It will be seen that many permutations may be made by different combinations of the various modifications of this invention, and while I have set forth only a few, I do not wish to be limited thereto.

The cooling medium is held in two reservoirs, not shown on the drawings, and each reservoir contains a medium of a different temperature. These reservoirs supply the two pipes 19 and 22 with their respective contents, and these pipes distribute the medium they receive to each of the temperature regulating valves 15 and 16. These valves mix the two media to the desired temperature, depending upon the adjustment of the valve, which in turn depends upon the position of the support 44 and cam members mounted thereon.

The mixed medium is then conveyed through the pipes to the pressure regulating valves 17 and 18. These last valves are also adjusted by the cam surfaces and in the desired ratio as determined by the contour of the cam faces. The medium is then carried through the conduits 6 and 7 to the trough where it flows through the channels provided therein and in which there is a heat interchange, tending to cool the trough and at the same time increasing the temperature of the cooling medium. After completing the course in the channel, it is discharged through the outlet pipes and suitably disposed of.

Prior to an operation, or a series of operations, it is determined just what differential in cooling is necessary in order to counteract the unequal expansion of the casting trough. Upon this determination, rests the particular contour of the cam surfaces.

The surfaces are so shaped that any increase in the cooling effect maintains a differential sufficient to compensate for the differential in the heat conducting properties of the trough. In this way an increase in the cooling effect may be obtained, and at the same time warpage of the trough prevented. The number of variable factors all going to make up the question of cooling, makes it almost impossible to have a direct and proportional variance in the extent to which the valves must be opened to obtain an increased cooling effect.

As above pointed out, it may be desirable, in certain cases, to have the pressure regulation precede the temperature regulation, and in such event, the same general principles apply as obtain in the other cases. The relative position of the pressure and temperature valves so far as concerns their regulation at a determined ratio, is optional, depending upon working conditions. The supports for the index of course may be modified to meet any arrangement desired. By index I mean a device for regulating the valves at a definite relationship to each other.

As also above pointed out, the position at which the feed-backs for the valves are positioned in the system, is a question of individual preference under different conditions of operation. And the presence or absence of feed-backs for the pressure regulating valves is also dependent upon the operating conditions and the types of valves employed.

By my invention warpage of a trough is prevented, insuring that a casting will not be injured by any scraping of the trough against the mold or poured metal, and also permitting the employment of a casting trough in a mold of small diameter, without the chance, heretofore encountered, of the mold injuring the apparatus. My invention also prolongs the operative life of a casting trough. By the regulating means herein set forth, the operation of the trough may be continued long after it has first shown signs of warpage. This results in a material saving to operators both in time and money.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims. It is to be particularly understood that flexible conduits, swivel connections, or other such means, may be used in lieu of the rigid pipes and connections shown in the drawings.

I claim:

1. In combination with a cooling system for a casting trough, cooling members in said trough, means for supplying a cooling medium to said members and pressure-regulating devices and a temperature-regulating device in said supply means and means for operating said devices in a definite relationship.

2. In a centrifugal casting machine in which a metal-conducting trough extends longitudinally within a rotating mold, a cooling system for preventing warpage of the trough comprising a cooling element associated with the trough, means for supplying a fluid at one temperature to the element, means for supplying a fluid at another temperature to the element, a valve for regulating the proportion of the two fluids admitted to the element for modifying their cooling effect, a valve for regulating the pressure of the fluids admitted to the element, and means for contemporaneously operating the valves in predetermined relationship with each other.

3. In a centrifugal casting machine in which a metal-casting trough extends longitudinally within a rotating mold, a cooling system for preventing warpage of the trough comprising cooling elements associated with the trough, a mixing chamber, means for supplying a fluid at one temperature to the chamber, means for supplying a fluid at another temperature to the chamber, a valve for regulating the proportions of the fluids admitted to the chamber, a conduit extending from the chamber to one of the elements, a valve in the conduit for regulating the pressure of the mixed fluid admitted to the element, a feed-back pipe extending between the conduit and the mixing chamber, and means for contemporaneously adjusting the temperature and pressure regulating valves at a predetermined ratio.

4. In a centrifugal casting machine in which a metal-conducting trough extends longitudinally within a rotating mold, a cooling system for preventing warpage of the trough comprising a plurality of cooling elements positioned in operative relationship with the trough, conduits for supplying the individual elements with a cooling medium and means for differentially regulating the flow of the medium in the conduits.

5. In a centrifugal casting machine in which a metal-conducting trough extends longitudinally within a rotating mold, a cooling system for preventing warpage of the trough comprising cooling elements positioned on opposite sides of the trough, conduits for supplying each of the elements with a cooling medium, and means for differentially regulating the flow of the medium in the conduits.

6. A method of preventing horizontal warpage of a casting trough of the type which extends longitudinally within a rotating mold which comprises subjecting portions of the trough to the influence of currents of a cooling fluid, and varying the cooling effect of the currents to compensate for unequal heating of the trough.

7. A method of preventing horizontal warpage of a casting trough of the type which extends longitudinally within a rotating mold which comprises subjecting opposite sides of the trough to the influence of currents of a cooling fluid and varying the cooling effect of the currents to compensate for unequal heating of the trough.

8. In a centrifugal casting machine in which a metal-conducting trough extends longitudinally within a rotating mold, a cooling system for preventing warpage of the trough comprising a plurality of cooling elements associated with the trough, means for supplying a cooling medium to said elements, and means for differentially regulating the temperature and pressure of the cooling medium supplied to the elements.

9. In a centrifugal casting machine in which a metal-conducting trough extends longitudinally within a rotating mold, a cooling system for preventing warpage of the trough comprising a plurality of cooling elements associated with the trough, means for supplying a cooling medium to said elements, valves for controlling the pressure of the medium supplied to the individual elements, and means for differentially actuating the valves.

10. In a centrifugal casting machine in which a metal-conducting trough extends longitudinally within a rotating mold, a cooling system for preventing warpage of the trough comprising a plurality of cooling elements associated with the trough, a plurality of valves for controlling the cooling effect of the cooling medium admitted to the different elements, an index member having means for actuating the valves, and means for moving the index member.

11. In a centrifugal casting machine in which a metal-conducting trough extends longitudinally within a rotating mold, a cooling system for preventing warpage of the trough comprising a plurality of channels associated with the trough, a valve chamber adapted to receive cooling media of different temperatures, a valve mechanism adapted to vary the proportion of each medium supplied to the valve chamber, a member for actuating the same in predetermined relationship, and a conduit connecting the valve chamber and the channels.

12. In a centrifugal casting machine in which a metal-conducting trough extends longitudinally within a rotating mold, a cooling system for preventing warpage of the trough comprising a mixing chamber, means for supplying a cooling medium at one temperature to the mixing chamber, means for supplying a cooling medium at another temperature to the mixing chamber, means for varying the proportions of the media supplied, and means for conducting the mixed media into cooling relation with the trough.

13. In a centrifugal casting machine in which a metal-conducting trough extends longitudinally within a rotating mold, a cooling system for preventing warpage of the trough comprising a plurality of cooling elements associated with the trough, means for supplying a cooling medium to said elements, and means for differentially regulating the temperature of the cooling medium supplied to each of the elements.

14. In a centrifugal casting machine in which a metal-conducting trough extends longitudinally within a rotating mold, a cooling system for preventing warpage of the trough comprising a cooling element associated with each side of the trough, a conduit for supplying a fluid to each element, means for regulating the temperature of the fluid supplied to each element, and means for regulating the pressure of the fluid supplied to each element.

15. In a centrifugal casting machine in which a metal-conducting trough extends longitudinally within a rotating mold, a cooling system for preventing warpage of the trough comprising a plurality of cooling elements associated with the trough, a conduit communicating with each element for supplying a cooling fluid thereto, pressure-regulating valves in each conduit, and means for differentially actuating the valves to vary the pressures of the fluids admitted to the elements.

16. In a centrifugal casting machine in which a metal-conducting trough extends longitudinally within a rotating mold, a cooling system for preventing warpage of the trough comprising a plurality of cooling elements associated with the trough, a temperature-regulating valve and a pressure-regulating valve connected in series with each element, and means adapted to contemporaneously actuate the temperature- and pressure-regulating valves of each element predetermined extents to vary the cooling effect of the fluids admitted to the elements.

In testimony whereof I affix my signature.

FRANK G. CARRINGTON.